(12) United States Patent
Schempp et al.

(10) Patent No.: US 7,019,687 B1
(45) Date of Patent: Mar. 28, 2006

(54) METHODS AND APPARATUS FOR SATELLITE INTEGRITY MESSAGING

(75) Inventors: Timothy R. Schempp, Anaheim, CA (US); Robert M. Fries, Irvine, CA (US); Thomas L. McKendree, Huntington Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/994,707

(22) Filed: Nov. 22, 2004

(51) Int. Cl.
*H04B 7/185* (2006.01)
(52) U.S. Cl. .............................. 342/357.02; 342/357.06
(58) Field of Classification Search ........... 342/357.01, 342/357.06, 357.07, 357.09; 701/207, 213
See application file for complete search history.

(56) References Cited

U.S. PATENT DOCUMENTS

| | | | |
|---|---|---|---|
| 6,429,808 B1 * | 8/2002 | King et al. ............ | 342/357.02 |
| 6,469,660 B1 * | 10/2002 | Horvath et al. ............. | 342/179 |
| 6,603,426 B1 | 8/2003 | Clark | |
| 6,711,478 B1 * | 3/2004 | Hilb ............... | 701/8 |
| 6,796,213 B1 | 9/2004 | McKendree et al. | |
| 6,813,519 B1 * | 11/2004 | Lebel et al. ................... | 607/32 |
| 2003/0140298 A1 * | 7/2003 | Koprivica .................... | 714/758 |
| 2004/0233097 A1 | 11/2004 | McKendree et al. | |
| 2004/0245369 A1 | 12/2004 | McKendree et al. | |
| 2005/0015680 A1 | 1/2005 | Rubin et al. | |

OTHER PUBLICATIONS

McKendree, Thomas L., et al., "Munition with Integrity Gated Go/No-Go Decision", U.S. Appl. No. 11/056,977, filed Feb. 11, 2005, 39 pages.
McKendree, Thomas L., et al., "Munition with Integrity Gated Go/No-Go Decision", U.S. Appl. No. 11/056,065, filed Feb. 11, 2005, 39 pages.
McKendree, Thomas L., et al., "A Method for Providing Integrity Bounding of Weapons", U.S. Appl. No. 10/912,963, filed Aug. 6, 2004, 35 pages.

* cited by examiner

*Primary Examiner*—Dao Phan
(74) *Attorney, Agent, or Firm*—Daly,Crowley,Mofford&Durkee,LLP

(57) ABSTRACT

Methods and apparatus for providing integrity alert information include embedding the integrity alert message in a longer message stream that is broadcast to a receiver in order to meet a predetermined time to alert. In one particular embodiment, the receiver is a GPS receiver, the longer message is a navigation signal, and the integrity alert message is a 50 bit word containing an updated user range accuracy index. Advanced GPS users recognize the embedded integrity alert message by its message ID, pass a parity check on the integrity alert message and use the updated user range accuracy index in subsequent signal processing. Legacy GPS users fail parity on the integrity alert message and discard the message. The impact on legacy users is negligible since the infrequent alerts will only occasionally cause data to be discarded.

25 Claims, 5 Drawing Sheets

METHODS AND APPARATUS FOR SATELLITE INTEGRITY MESSAGING

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates to methods and apparatus for providing integrity alert messaging in a satellite system and more particularly, to methods and apparatus for embedding an integrity alert message in a GPS navigation signal.

BACKGROUND OF THE INVENTION

The Global Positioning System (GPS) includes 24 satellites that broadcast navigation information in the form of RF signals. GPS receivers process the navigation signals in order to determine precise position, velocity and time and are widely used in both military and civilian applications. Examples of GPS applications include aircraft navigation and landing systems, transportation systems, and weapon systems.

When the GPS malfunctions, errors are introduced into the transmitted navigation signals, thereby resulting in errors in the position, velocity and time calculations performed by receivers. Due to the critical nature of many GPS applications, such errors in the navigation signals can cause significant safety concerns. When the GPS is functioning properly, the navigation signals are characterized as having "integrity" and the GPS position solution meets its advertised accuracy requirements.

Newer GPS receivers are referred to herein as advanced users and include, but are not limited to GPS III receivers, with rigid accuracy and integrity requirements. Specifically, GPS III users require position errors with accuracy better than 1 meter. In order to meet these requirements, it is necessary that users be alerted to conditions that cause a particular accuracy degradation (i.e., a loss of integrity). According to one GPS specification, users must be alerted when the navigation signal's error exceeds the User Range Accuracy (URA) index (i.e., a statistical indicator of the ranging accuracies achievable with the satellite) multiplied out to 4.42 standard deviations. In GPS III, it is required that users be alerted to such a condition within 5.2 seconds of the condition arising (i.e., the required "time to alert" is 5.2 seconds). By contrast, some older GPS receivers, referred to herein as legacy users, have position accuracy requirements on the order of multiple meters and require a time to alert on the order of 6 hours.

Various mechanisms have been developed to monitor the integrity of GPS signals. As one example, a system known as Wide Area Augmentation System (WAAS) provides integrity monitoring by employing several ground stations at known locations over North America. Each ground station receives and processes navigation signals from the GPS satellites in order to calculate its own position. The calculated position is compared to the known position in order to determine the accuracy of the navigation signals. Alternatively or additionally, a satellite monitoring scheme may be used in which each satellite monitors itself or monitors itself and other satellites, as is described in a U.S. Pat. No. 6,603,426 entitled "Satellite Integrity Monitor and Alert" which issued on Aug. 5, 2003.

One technique used to protect GPS users from using hazardously misleading navigation signals is to make the satellite signal unusable to all users. This is achieved by switching the satellite signal to a non-standard code that users do not no how to interpret. However, use of this approach is not optimal since some GPS users, particularly legacy users that have less stringent accuracy requirements, would be denied service from the GPS satellite unnecessarily.

What is needed is a way to alert GPS users to a loss of integrity with sufficient speed to satisfy safety concerns and regulatory standards while keeping the signal usable to users with less stringent requirements. One way to meet this need is to create a new message type for purposes of conveying the integrity alert message. However, with the current GPS messaging scheme, a new message could only be guaranteed to get to users within 30 seconds of the onset of a problem. It is highly advantageous to provide integrity alert data in a manner that does not adversely impact legacy users, either in terms of degradation of service or by requiring an equipment modification or upgrade, since there are an enormous number of legacy receivers in use.

SUMMARY OF THE INVENTION

In accordance with the present invention, a method of transmitting an integrity alert message to a receiver includes embedding an integrity alert message in a longer legacy message which is in the process of being broadcasted. Such an alert message would occur in response to the detection of a hazardous condition to meet a predetermined time to alert.

In one particular embodiment, the receiver is a GPS receiver, the longer message is a navigation signal, and the integrity alert message is a 50 bit word containing an updated User Range Accuracy (URA) index. The integrity alert message further contains a message ID selected from one of a plurality of valid message IDs, two IODE portions, and a CRC.

Advanced users are responsive to the integrity alert message and legacy users are not responsive to the integrity alert message. In one embodiment, advanced users recognize the integrity alert message by whether or not it contains a valid message ID. In further processing, advanced users pass a parity check on the integrity alert message and use the updated URA in subsequent signal processing. In the context of this invention, parity check may take the form of a conventional CRC or other digital signature or 1-way digital authentication technique. Different GPS signals use different digital authentication techniques.

Legacy users fail a parity check on the integrity alert message and discard the message. The impact of discarding the integrity alert message is negligible on legacy users since the infrequent alerts will only occasionally cause navigation information to be discarded. And advantageously, no modification is required to the legacy user equipment to function in a GPS system employing the invention.

In accordance with another aspect of the present invention, a satellite includes a processor for embedding into a longer message an integrity alert message indicative of the satellite not meeting a predetermined accuracy requirement and a transmitter for transmitting the longer message to satellite uses in order to meet a predetermined time to alert.

The satellite further includes an encoder for encoding the longer message for transmission.

With this arrangement, a method and apparatus are provided for alerting satellite users to a loss of integrity in a manner that meets time to alert requirements. Advantageously, the integrity alert messaging scheme does not adversely impact legacy users, either in terms of degradation of service or by requiring equipment modifications.

BRIEF DESCRIPTION OF THE DRAWINGS

The foregoing features of this invention, as well as the invention itself may be more fully understood from the following description of the drawings in which.

DETAILED DESCRIPTION OF THE INVENTION

Figure 1:
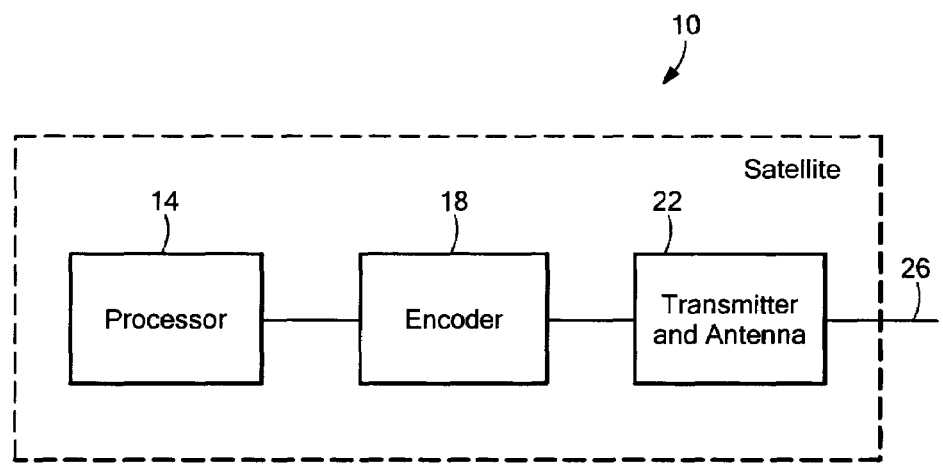
FIG. 1 is a block diagram of a simplified GPS satellite.

Referring to FIG. 1, a satellite 10 forming part of the Global Positioning System (GPS) includes a processor 14, an encoder 18, and a transmitter and antenna 22. The processor 14 generates a navigation message which is broadcast by the antenna. The encoder modulates the message into an RF carrier signal and provides an encoded RF signal to the transmitter and antenna 22. The transmitter/antenna 22 transmits the RF navigation signal 26 to GPS users in view of the satellite 10.

The navigation signal 26 contains the information necessary to allow GPS users to determine their position, velocity and time. To this end, the navigation signal contains ephemeris information and thus, may be referred to alternatively as an ephemeris signal. The navigation signal includes a User Range Accuracy (URA) index. The URA is a statistical indicator of the ranging accuracies achievable with the particular satellite and the URA is used by receivers in various conventional processes. As examples, the URA may be used in a Receiver Autonomous Integrity Monitoring (RAIM) process in which the receiver combines the URA from the satellites in its view to determine the uncertainty in the position solution.

A new navigation signal 26 with updated ephemeris data is broadcast every 30 seconds at a rate of 50 bps. Thus, the navigation signal is a 1500 bit signal. For L1 and L2 band operation, the navigation signal is a broken into 200 bit portions or message blocks and for L5 operation, the navigation signal is a broken into 300 bit portions or message blocks.

According to the invention, when a hazardous condition is detected, an integrity alert message is generated and inserted into a longer message that is currently being broadcast to a receiver in order to meet a predetermined time to alert requirement. In one particular embodiment, the longer message is a standard GPS navigation signal, the receiver is a GPS receiver, and the integrity alert message contains an updated URA. As will be described, advanced GPS users detect the presence of the integrity alert message in the navigation signal and use the updated URA to clear the otherwise hazardous condition, whereas legacy GPS users discard navigation signals that contain an integrity alert message.

With this arrangement, advanced GPS users are alerted to a loss of integrity with sufficient speed to satisfy safety concerns and regulatory standards and in a manner that is backward compatible for use with legacy users and that does not adversely impact the service provided to the legacy users. Further, these advantages are achieved without requiring any additional satellite power or major changes on the satellite.

In one embodiment, the integrity alert message is a 50 bit word that is inserted into the navigation signal and contains: a 5 bit message ID, a first, 8 bit IODE, and a second, 8 bit IODE. The IODE refers to the Issue of Data Ephemeris and is used to identify a particular navigation signal. For example, receipt of a message block that has a different IODE than a previously received message block indicates that the just received message block contains new ephemeris information. A user uses the IODE to tie different message blocks together. In this embodiment of the invention, the user will use the IODE in the alert message to tie the alert to the IODE of the navigation data. Two IODE values are provided so the message can be tied to either the current navigation signal or the previously broadcast navigation signal which some users may still be using. A navigation signal may be broadcast for up to two hours.

An updated URA as contained in an integrity alert message according to the invention is associated with a particular ephemeris message. Thus, as will become apparent from the flow diagram of FIG. 5, the IODE in the integrity alert message is used to determine whether or not the updated URA in the integrity alert message should be used with the active ephemeris data.

The integrity alert message further contains an updated, 5 bit URA index, and a 24 bit cyclic redundancy check (CRC). As will be described, upon passing parity on an integrity alert message, advanced GPS users update their URA index in response to the received URA index. Legacy users on the other hand discard the navigation signal containing an integrity alert message, and thus, are at risk for using a URA that is too small. Legacy users are not using the GPS signal for operations which require an alert within 5.2 seconds. Legacy users will be alerted with a new URA when the next ephemeris is broadcast which will be approximately 30 seconds later.

The flow diagrams shown herein illustrate techniques which would be implemented in an electronic device or in a computer processor, such as the processor 14 of FIG. 1. Rectangular elements, herein denoted "processing blocks," can represent computer software instructions or groups of instructions. Diamond shaped elements, herein denoted "decision blocks," can represent computer software instructions, or groups of instructions that affect the execution of the computer software instructions represented by the processing blocks. Alternatively, the processing and decision blocks represent functions performed by functionally equivalent circuits, such as a digital signal processor circuit or Application Specific Integrated Circuit (ASIC), or discrete electrical components. The flow diagrams do not depict the syntax of any particular programming language. Rather, the flow diagrams illustrate the functional information one of ordinary skill in the art requires to fabricate circuits or to generate computer software to perform the processing required of the particular apparatus. It will be appreciated by those of ordinary skill in the art that, unless otherwise indicated herein, the particular sequence of blocks described is illustrative only and can be varied without departing from the spirit of the invention. Thus, unless otherwise stated, the blocks described below are unordered meaning that, when possible, the blocks can be performed in any convenient or desirable order.

Figure 2:
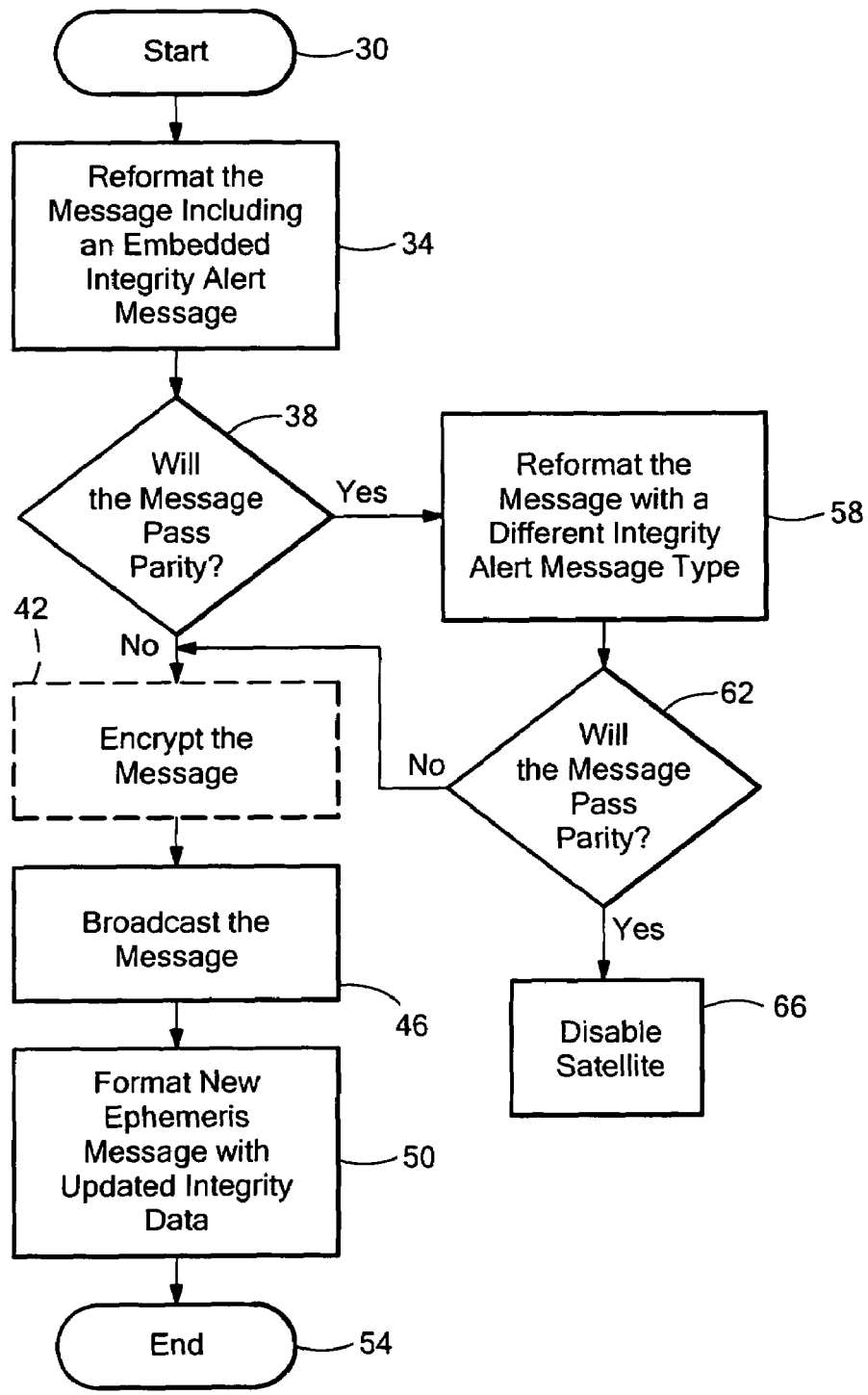
FIG. 2 is a flow diagram illustrating a process performed by the GPS satellite for alerting GPS users to a loss of integrity.

Referring to FIG. 2, a process performed by a processor 14 (FIG. 1) commences at block 30 in response to detection of a hazardous condition. The process of FIG. 2 includes embedding into a longer message an integrity alert message and broadcasting the longer message to a receiver, wherein a predetermined time to alert is achieved. The process has applicability to a wide range of systems and messages. The process is described herein in conjunction with a satellite system in which the receiver is a GPS receiver and the longer message is a navigation signal.

The process commences in response to a determination, either by the satellite itself or by a satellite monitor, that the satellite is not meeting a predetermined accuracy requirement (i.e., that there has been a loss of integrity). As one example, a loss of integrity is detected when the navigation signal's error is greater than 30 meters and the URA index multiplied out to 4.42 standard deviations is less than 30 meters. However, it will be appreciated by those of ordinary skill in the art that other indicia of a loss of integrity may be used.

In block 34, the processor 14 reformats a longer message, such as a GPS navigation signal, by embedding in it an integrity alert message, such as the illustrative 50 bit integrity alert message described above. The integrity alert message will be embedded in the longer message which is in the process of being broadcast so as to overwrite whatever portion of the message would have been transmitted at the time that the loss of integrity is detected.

In decision block 38, it is determined whether the longer message would pass the parity check performed by GPS users. GPS users, both legacy users and advanced users, perform an integrity, or parity check on received navigation signals. The parity check may take the form of a conventional CRC or other digital signature or 1-way digital authentication technique. The satellite processor 14 performs the same tests as the GPS users will use in order to determine whether the integrity alert message would pass parity. This step ensures that a user will not misinterpret a navigation message with an embedded integrity alert as a valid navigation message.

If it is determined that the message would pass parity, then in block 58, the integrity alert message is reformatted with a different integrity alert message type. In the described embodiment in which an integrity alert message contains one of two valid message IDs, the message is reformatted by changing the message ID to the other one of the two valid message IDs. As one example, the embedded integrity alert message may contain a message ID of 11100 in block 34 and a message ID of 00111 in block 58.

In decision block 62, it is determined if the reformatted integrity alert message would pass parity. If the message would pass parity, then the satellite 10 is effectively turned off in block 66, such as with the use of a non-standard code.

If it is determined in block 38 or in block 62 that the message would not pass parity, then optionally, encryption may be applied to the message in block 42. Encryption is required in certain types of GPS applications, such as M code, and may utilize various conventional encryption techniques, such as AES encryption. The public must not be able to identify the integrity alert message in the M code signal and rebroadcast them in a usable fashion. If that were possible, it would be possible to disable GPS equipment by broadcasting integrity interrupt messages. For this reason, the integrity alert message is tied to the IODE of the active ephemeris data and encrypted. A spoofer has no way to know the IODE of the navigation message on the M code signal and has no way to broadcast an M code integrity interrupt message that a user would use.

The message is broadcast by the transmitter/antenna 22 (FIG. 1) in block 46 and a new ephemeris message containing updated integrity data is formatted in block 50, following which the process terminates in block 54, as shown. In one embodiment, the new ephemeris message contains the updated URA and IODEs.

The integrity alert message is broadcast for 30 seconds. In one embodiment, advanced users are required to reinitialize the ephemeris message after losing the signal for more than 60 seconds in order to guarantee that a user does not miss an integrity alert message due to intentional or unintentional interference, as could occur if the receiver were jammed during the 30 second broadcast of the integrity alert message for example.

Figure 3:
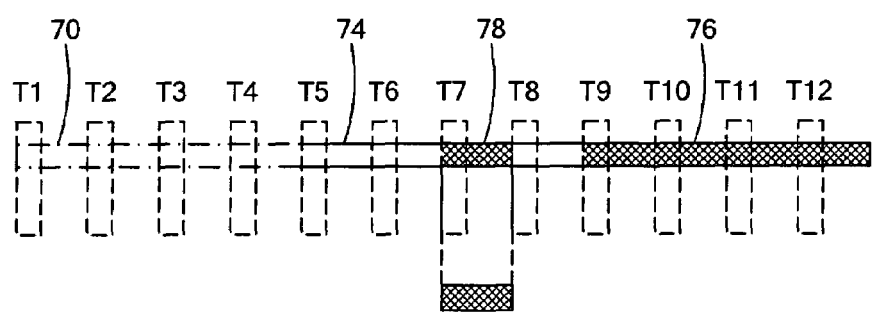
FIG. 3 is a timing diagram illustrating the timing of an integrity alert message embedded in a GPS navigation signal.

Referring also to FIG. 3, a timing diagram illustrates the timing of an integrity alert message embedded in a navigation signal. In the illustrative embodiment, the navigation signal is transmitted as a plurality of 4 second signal blocks, only three of which are shown 70, 74, and 76. Message blocks 70 and 76 do not contain an integrity alert message and message block 74 does contain an integrity alert message 78.

As will be described further in conjunction with FIG. 4, in the case of a legacy user, the GPS receiver performs a parity check on each message block. Since message block 70 does not contain an integrity alert message, parity will be passed and the legacy receiver will use the message block 70. And as will be described further in conjunction with FIG. 5, advanced users monitor the received GPS signal every second to determine whether the 50 bits received during the previous second contain a valid message ID indicative of the message block 70 containing an integrity alert message. Since message block 70 does not contain an integrity alert message, an advanced user will not detect a valid message ID while processing any of the one second portions of message block 70.

Beginning at time T5, a message block 74 containing an integrity alert message 78 is transmitted. At time T9, legacy users receiving the message block 74 perform a parity check on the message block, find that it fails, and discard the message. Again, advanced users that monitor the received GPS signal every second determine, at time T8, upon considering the last 50 received bits, that the integrity alert message 78 does contain a valid message ID. Advanced users will perform a parity check on the integrity alert message 78, pass the check, and use the data contained in the integrity alert message 78 to avoid the hazardous condition accordingly.

Figure 4:
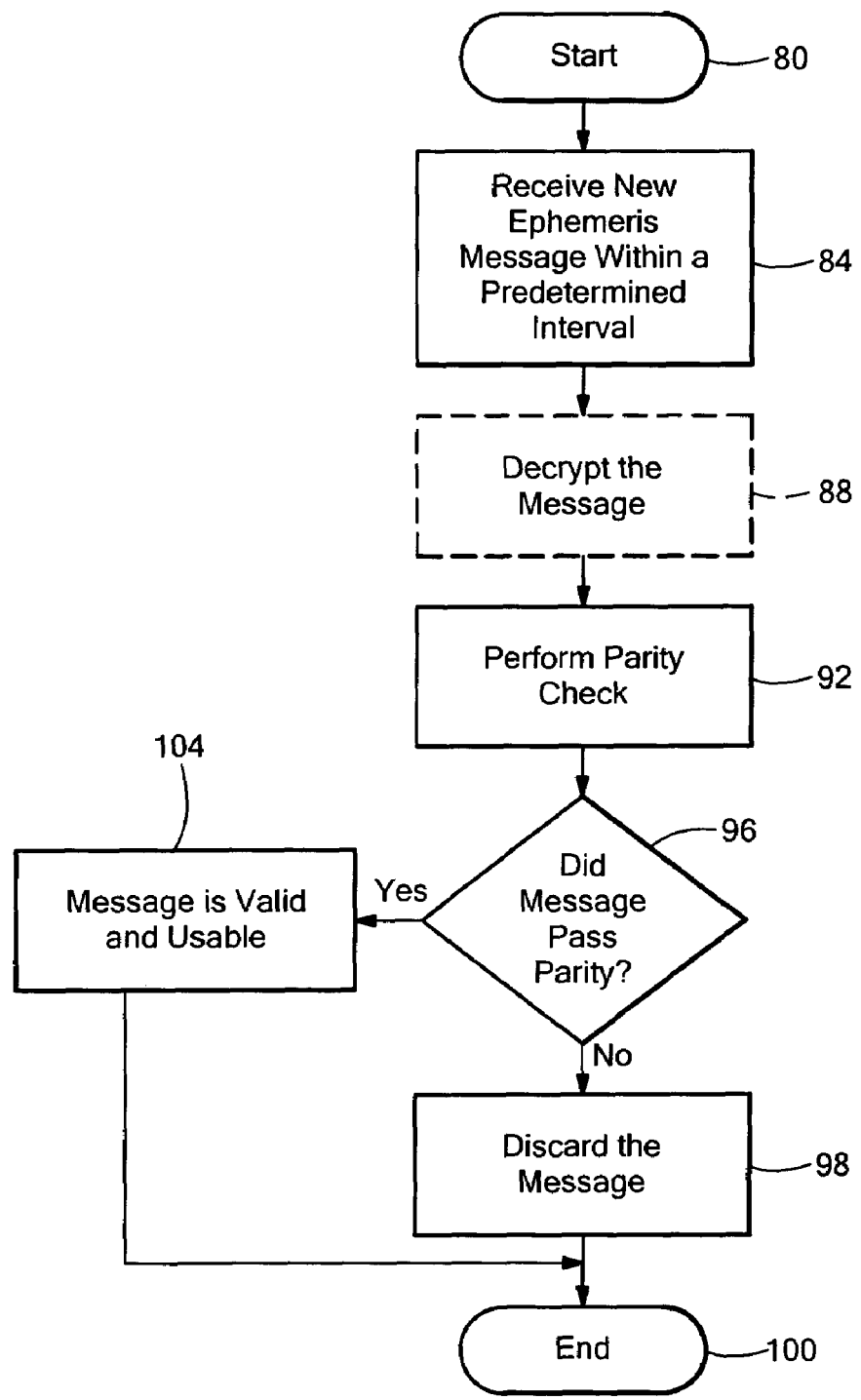
FIG. 4 is a flow diagram illustrating a process performed by a legacy GPS user in response to receipt of an integrity alert message.

Referring also to FIG. 4, a process performed by a legacy user in response to receipt of a navigation signal commences at block 80. Legacy users wait to receive an entire portion of the navigation signal, such as a 4 or 6 second message block, before processing the received bits. In block 84, the legacy user receives a new ephemeris message, as occurs within a predetermined time interval. In one embodiment, the legacy user receives a new message every 30 seconds. Optionally, in block 88, the received message is decrypted as is necessary in the case of an M code signal. In block 92, the legacy user performs a parity check on the received message block.

In decision block 96, it is determined whether or not the message block passes the parity check. If the message block does pass the parity check, then it is determined to be valid and useable in block 104. Alternatively, if the signal does not pass parity, then it is discarded in block 98, following which the process ends at block 100.

Since integrity alerts occur and thus, are embedded into navigation signals relatively infrequently, such as on the order of once or twice per week, the resulting occasional discarding of data by legacy users has a negligible effect on their performance. In the worst case, the legacy user will have to wait an additional 30 seconds to receive a new navigation signal.

Figure 5:
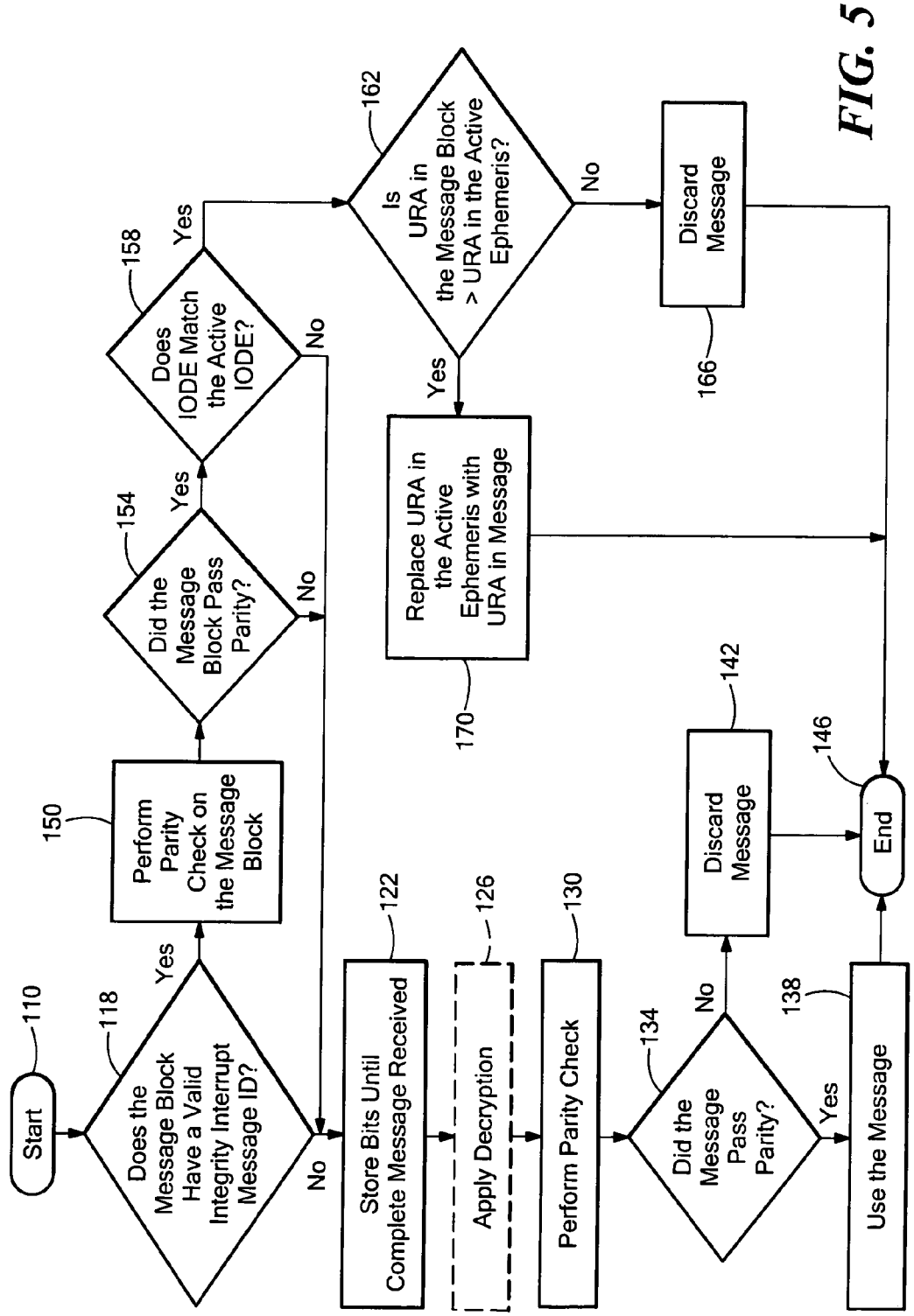
FIG. 5 is a flow diagram illustrating a process performed by an advanced GPS user in response to receipt of an integrity alert message.

Referring also to FIG. 5, a process performed by advanced GPS users, such as GPS III receivers, in response to receipt of a navigation signal portion, or message block, commences at block 110. Recall that advanced GPS users process a received signal in 50 bit segments. More particularly, advanced users test the first 50 bits received after the GPS epoch (i.e., the beginning of each second according to an average of all of the GPS clocks) and more particularly, test the first 5 bits of each 50 bits received in order to determine whether they match a valid message ID. Thus, unlike legacy users, advanced users wait for only a small portion of the navigation signal to be received before processing the received bits.

In decision block 118, it is determined whether or not the received message contains one of the two valid message IDs indicative of an integrity alert message. If it is determined that the received message block does contain a valid message ID, then in block 150, a parity check is performed on the last message block (i.e., on the last received 50 bits). If the parity check is passed, as is determined in decision block 154, then it is determined, in decision block 158, whether or not at least one of the two IODEs in the received message block matches the active IODE (i.e., the last received IODE).

If neither IODE in the received signal matches the active IODE, then in decision block 162, it is determined whether or not the URA in the received message is greater than the URA in the active ephemeris message. The URA in the active ephemeris message refers to the URA in the last received navigation signal, which is stored in memory by the processor 14 (FIG. 1). It is expected that the received URA will be larger than the URA in the active ephemeris, since this would be the case when a GPS malfunction occurs. Under this condition, the URA in the stored active ephemeris is replaced with the received URA in block 170, following which the process ends. Alternatively, the message is discarded in block 166, as may occur as a result of the satellite malfunctioning and putting the wrong URA index in the integrity alert message, following which the process ends in block 146.

If the parity check in the block 154 fails, neither IODE in the received signal matches the active IODE in block 158, or the message block does not contain a valid message ID in block 118, then the process moves to block 122 for further processing. If in decision block 118, it is determined that the received message block does not contain a valid message ID, then in block 122, the received bits are stored until the entire 4 or 6 second navigation signal message block is received. In block 126, the received message block is decrypted, as may be necessary in the case of systems using the M code. In block 130, a parity check is performed on the received message block, following which it is determined in decision block 134 whether or not the message block passed parity. If the message block passes parity, then the integrity alert data is used in block 138, following which the process ends. Alternatively, if the message does not pass parity then the message is discarded in block 142, following which process ends at block 146.

With the invention, integrity alerts are provided to advanced GPS users within 2.2 seconds of the time that the satellite becomes aware of the problem using integrity offered by L1 and L2 M code signals, L1 C/A and L5 signals, L1 C/A and L2C signals, and L2C and L5 signals. (i.e., one second to wait for the start of the epoch, 1 second to transmit the message, and 0.2 seconds is the time it takes the message to get from the satellite to the user.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. A method of transmitting an integrity alert message to a receiver comprising:

embedding an integrity alert message in a longer message in response to detection of a hazardous condition; and broadcasting the longer message to a receiver, wherein a predetermined time to alert is achieved.

2. The method of claim 1 wherein the longer message is a navigation signal transmitted by a Global Positioning System (GPS) satellite.

3. The method of claim 1 wherein the integrity alert message has a length on the order of 1 second.

4. The method of claim 1 wherein the integrity alert message comprises a message ID selected from one of a plurality of valid message IDs.

5. The method of claim 1 wherein the integrity alert message comprises two Issue of Data Ephemeris (IODE) portions.

6. The method of claim 1 wherein the integrity alert message comprises a User Range Accuracy (URA) index.

7. The method of claim 1 wherein the integrity alert message comprises a Cyclic Redundancy Check (CRC).

8. The method of claim 1 wherein the receiver is either a first type of receiver that is responsive to the integrity alert message or a second type of receiver that is not responsive to the integrity alert message.

9. The method of claim 8 wherein the first type of receiver is a GPS III receiver and the second type of receiver comprises all other GPS receivers.

10. The method of claim 8 wherein the second type of receiver performs and fails a parity check on the integrity alert message.

11. The method of claim 8 wherein the first type of receiver monitors the integrity alert message to determine whether the integrity alert message comprises a valid message ID.

12. The method of claim 8 wherein the first type of receiver performs and passes a parity check on the integrity alert message.

13. A satellite comprising:

a processor for embedding into a longer message an integrity alert message indicative of the satellite not meeting a predetermined accuracy requirement; and a transmitter for transmitting the longer message to satellite users in order to meet a predetermined time to alert.

14. The satellite of claim 13 further comprising an encoder for encoding the longer message for transmission to the satellite users.

15. The satellite of claim 13 wherein the integrity alert message has a length on the order of 1 second.

16. The satellite of claim 13 wherein the longer message has a length on the order of 30 seconds.

17. The satellite of claim 13 wherein the integrity alert message comprises a message ID selected from one of a plurality of valid message IDs.

18. The satellite of claim 13 wherein the integrity alert message comprises two IODE portions.

19. The satellite of claim 13 wherein the integrity alert message comprises a User Range Accuracy (URA) index.

20. The satellite of claim 13 wherein the integrity alert message comprises a Cyclic Redundancy Check (CRC).

21. The satellite of claim 13 wherein the satellite users are one of a first type of satellite user that is responsive to the integrity alert message or a second type of satellite user that is not responsive to the integrity alert message.

22. The satellite of claim 21 wherein the first type of satellite user is a GPS III user and the second type of satellite user comprises all other GPS receivers.

23. The satellite of claim 21 wherein the second type of satellite user performs and fails a parity check on the integrity alert message.

24. The satellite of claim 21 wherein the first type of satellite user monitors the integrity alert message to determine whether the integrity alert message comprises a valid message ID.

25. The satellite of claim 21 wherein the first type of satellite user performs and passes a parity check on the integrity alert message.

* * * * *

UNITED STATES PATENT AND TRADEMARK OFFICE
CERTIFICATE OF CORRECTION

PATENT NO.        : 7,019,687 B1                                     Page 1 of 1
APPLICATION NO. : 10/994707
DATED              : March 28, 2006
INVENTOR(S)       : Schempp et al.

It is certified that error appears in the above-identified patent and that said Letters Patent is hereby corrected as shown below:

Column 2, line 9, delete "do not no how" and replace with -- do not know how --.

Column 3, line 57, delete "is a broken" and replace with -- is broken --.

Column 3, line 59, delete "is a broken" and replace with -- is broken --.

Column 6, line 22-23, delete "message for example." and replace with -- message, for example. --

Signed and Sealed this

Twenty-second Day of May, 2007

JON W. DUDAS
*Director of the United States Patent and Trademark Office*